D. R. BURNS.
HEN'S NEST.
APPLICATION FILED AUG. 12, 1913.

1,110,108.

Patented Sept. 8, 1914.
2 SHEETS—SHEET 1.

Witnesses
C. N. Walker.
E. E. Alger.

Inventor
Daniel R. Burns

By
Attorney

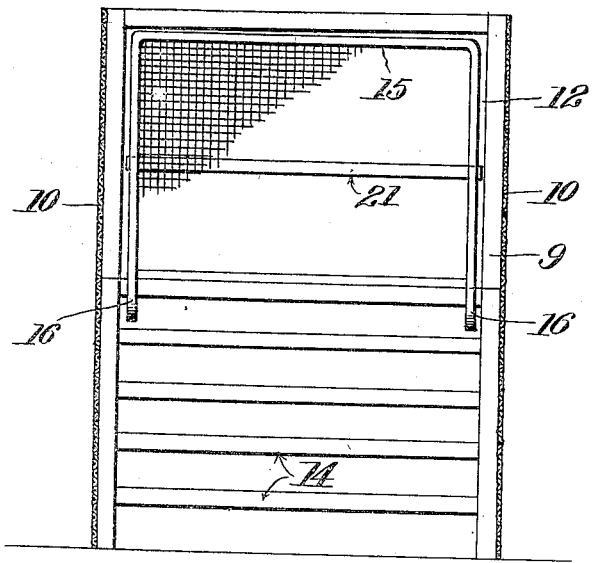
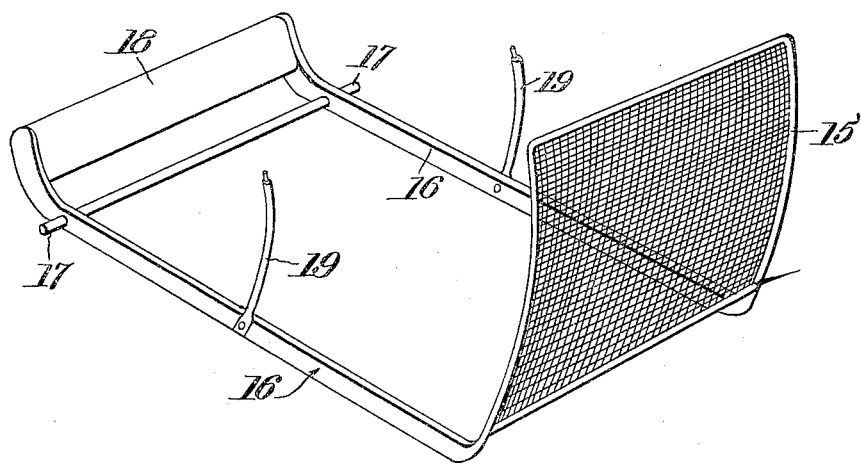

UNITED STATES PATENT OFFICE.

DANIEL R. BURNS, OF NEAR WILDORADO, TEXAS.

HEN'S NEST.

1,110,108.  Specification of Letters Patent.  Patented Sept. 8, 1914.

Application filed August 12, 1913. Serial No. 784,464.

*To all whom it may concern:*

Be it known that I, DANIEL R. BURNS, a citizen of the United States, residing near Wildorado, Oldham county, Texas, but in the county of Randall and State of Texas, have invented certain new and useful Improvements in Hens' Nests, of which the following is a specification.

This invention relates to nests.

One object is to provide a nest particularly adapted for fowls embodying among other characteristics means whereby when the fowl enters the nest a door is operated to close the entrance into the nest so as to prevent the fowl in the nest from being disturbed by other fowls and which also embodies means whereby when the fowl leaves the nest the door is opened automatically.

Another object resides in the provision of what may be termed a trap nest which is set automatically by the fowl upon entering the nest and which is operated automatically by the fowl upon leaving the nest so as to permit the trapped fowl to be released and, until released automatically by itself, not disturbed by other fowls.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

Figure 1:
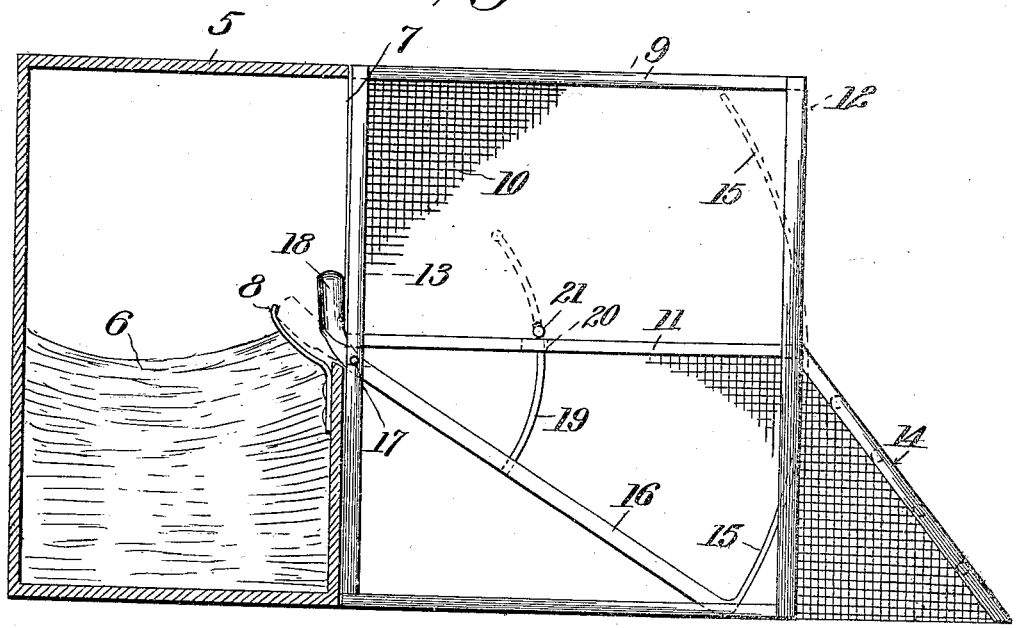
Figure 2:
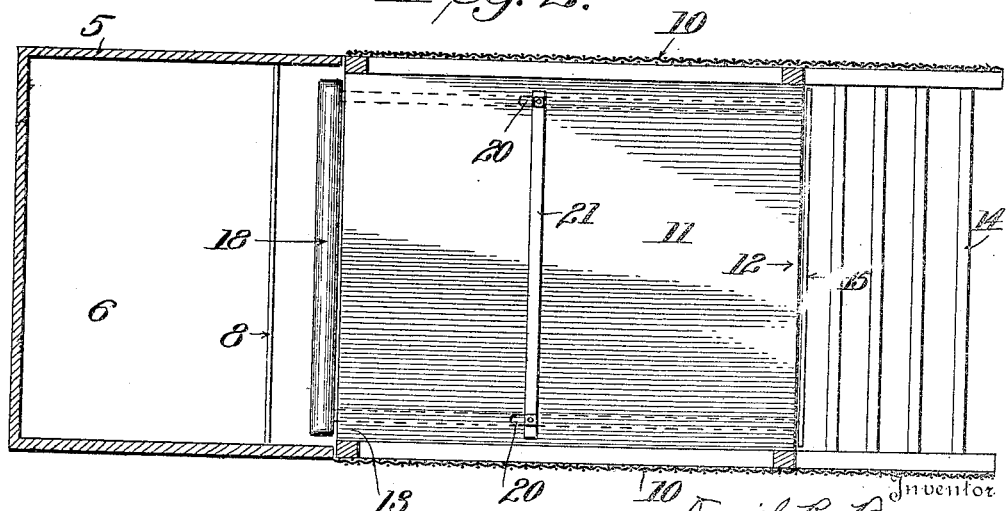

In the drawings:—Figure 1 is a view partly in side elevation and partly in vertical section illustrating my invention. Fig. 2 is a horizontal sectional view of the invention. Fig. 3 is a front view. Fig. 4 is a detail perspective view of the door and its operating parts.

Referring now more particularly to the accompanying drawings the reference character 5 indicates a nest compartment in which the nest 6 is disposed and having an opening 7 in its upper front portion. This nest compartment may be composed of any suitable material and adjacent the lower edge of its opening 7 it is provided with a metallic or other shield 8 secured in any suitable manner to the nest compartment and extending upwardly and inwardly for the purpose of preventing the straw or other material of which the nest may be formed from working out of the compartment through the opening 7.

A trap compartment 9 is provided and is composed of suitable framework to which may be secured in any suitable manner foraminated material 10. This trap compartment 9 has a partition 11 which forms a floor and it also has a front opening 12 and a rear opening 13. Fowls may enter the front opening 12 by way of the ladder 14 and pass over the floor partition 11, entering the nest compartment 5 through the opening 7 of the latter and the rear opening 13 of the trap compartment.

To prevent the fowl entering the nest compartment from being disturbed by another fowl I provide a curved or other shaped door 15 which is provided with a pair of arms 16 secured by means of suitable pivots 17 adjacent their inner ends to the rear of the trap compartment with their inner extremities extending preferably into the nest compartment 5. These extremities of the arms 16 which project into the nest compartment 5 are connected by a weight 18 which when the fowl steps on it it is caused to move downwardly and consequently the arms 16 and door 15 are thrown upwardly to close the opening at the front of the trap compartment above the ladder 14. The weight 18 is heavy enough to overcome the weight of the arms and the door so that under the influence of the weight itself when the latter has once been moved downwardly into the dotted line position shown in Fig. 1 it will hold the door normally closed with the result that the fowl in the nest compartment cannot be disturbed by other fowls while on the nest. The weight 18 in its downward position normally engages the shield 8, as shown by the dotted lines in Fig. 1, and therefore this shield 8 provides means not only to prevent the nest material from working out of the nest compartment but it insures the proper space for the downward movement of the weight 18. The downward movement of the weight 18 might be interfered with if means were not provided to keep the nest material away from the bottom opening 7 of the nest compartment. Thus the element 8 performs a dual function, that is, it prevents the nest material from working out of the nest compartment and it also prevents the nest material from in any way interfering with the efficient working of the trap door.

When a fowl leaves the nest compartment through the opening 7 and enters the trap compartment 9 it walks along the floor partition 11. In order that the fowl upon entering the trap compartment 9 on its way out of the device may open the door of the trap compartment I provide the aforesaid arms 16 with a pair of curved arms 19 which extend upwardly through apertures 20 in the floor partition 11. The free ends of these arms 19 are connected by a bar 21. The fowl upon contacting with or engaging the bar 21 causes the door 15 and its arm 16 to overcome the weight 18. In other words, by engagement of the bar 21 or the arms 19 by the fowl on its way outwardly through the trap compartment 9, the weight 18 is caused to move from its seat on the shield 8 with the result that the arms 16 and the door 15 move downwardly so that the fowl may then leave the trap compartment 9 through the front opening 12 thereof, while the weight 18 moves to the position shown by the full lines in Fig. 1, in which position it is held by the friction of the pivots 17.

The trap compartment may be formed of any suitable material other than the framework and foraminated material described but where the trap compartment is composed of the framework and foraminated material referred to, the foraminated material is preferably continued over the space between the sides of the ladder 14 and the front edge of the trap compartment 9 as shown particularly in Figs. 1 and 2.

What is claimed is:—

1. A device of the character described comprising a nest compartment having an opening at its upper front portion, a trap compartment disposed adjacent the nest compartment and communicating with the latter and open at its front, a partition in the trap compartment forming a floor, a door for the opening at the front of the trap compartment, a pair of arms secured to the door and mounted on pivots on the trap compartment with the arms projecting into said nest compartment, a weight connecting the free ends of the arms which weight is depressed under the weight of the fowl stepping on it and which causes said arms to move on their pivots to throw said door over the opening at the front of the trap compartment and hold the door in closed position, curved arms connected to the aforesaid arms and projecting through said floor partition, a bar connected to the free ends of the second mentioned arms and arranged in the path of the fowl so that when the fowl leaves the nest and enters the trap compartment said bar is engaged by the fowl which causes the door and its arms to overcome the influence of said weight, the door thereby moving downwardly to permit the fowl to leave the trap nest, a ladder leading to the opening at the front of the trap compartment, and a shield to keep the nest material away from the weight and out of the trap compartment.

2. A device of the character described comprising a nest compartment, a trap compartment having communication with the nest compartment and having an opening in its front, a weighted door to open and close the opening at the front of the trap compartment, the weight of the weighted door being engageable by the fowl upon entering the nest compartment, and the weight itself when engaged by the fowl upon entering the nest itself holding the door in closed position over the opening at the front of the trap compartment, and means arranged in the trap compartment in the path of the fowl and engageable by the fowl upon leaving the nest compartment and entering the trap compartment to cause the door to overcome the influence of the weight and move to open position with relation to the opening at the front of the trap compartment.

3. A device of the character described comprising a nest compartment, a trap compartment having communication with the nest compartment and provided at its upper portion with an opening for the entrance and exit of fowls, a partition in the trap compartment forming a floor and having openings adjacent its side edges, a door for the opening at the front of the trap compartment, weighted arms secured to the door pivotally connected to the nest compartment, arms secured to the aforesaid arms and projecting through the aforesaid openings of the platform, and a bar connected to the free ends of the second mentioned arms.

In testimony whereof I affix my signature in presence of two witnesses.

DANIEL R. BURNS.

Witnesses:
M. W. TURNER,
FLORD T. MITCHELL.

---

Copies of this patent may be obtained for five cents each, by addressing the "Commissioner of Patents, Washington, D. C."